United States Patent
Takano

(10) Patent No.: US 8,656,168 B2
(45) Date of Patent: Feb. 18, 2014

(54) INFORMATION PROCESSING APPARATUS, RECOVERY APPARATUS, AND DISK RECOVERY METHOD

(75) Inventor: Kiyoshi Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 50 days.

(21) Appl. No.: 13/354,943

(22) Filed: Jan. 20, 2012

(65) Prior Publication Data

US 2012/0239931 A1    Sep. 20, 2012

(30) Foreign Application Priority Data

Mar. 16, 2011 (JP) ................. 2011-058294

(51) Int. Cl.
*H04L 9/32* (2006.01)
*G06F 7/04* (2006.01)

(52) U.S. Cl.
USPC ............. 713/170; 713/168; 726/26; 380/2

(58) Field of Classification Search
USPC ................ 380/2; 713/168, 170; 726/26
See application file for complete search history.

(56) References Cited

U.S. PATENT DOCUMENTS

| | | | |
|---|---|---|---|
| 2003/0041221 A1* | 2/2003 | Okada ........................ | 711/164 |
| 2004/0221024 A1 | 11/2004 | Yamada et al. | |
| 2005/0084108 A1* | 4/2005 | Durand et al. ............... | 380/259 |
| 2007/0162666 A1* | 7/2007 | Ise ............................. | 710/62 |
| 2009/0010570 A1* | 1/2009 | Yamada et al. ............. | 382/312 |
| 2009/0094352 A1* | 4/2009 | Sharma et al. .............. | 709/220 |
| 2009/0327731 A1* | 12/2009 | Appenzeller et al. ........ | 713/171 |
| 2010/0138686 A1* | 6/2010 | Arata et al. ................. | 714/4 |

* cited by examiner

*Primary Examiner* — Beemnet Dada
*Assistant Examiner* — Kalish Bell
(74) *Attorney, Agent, or Firm* — Maschoff Brennan

(57) ABSTRACT

An information processing apparatus includes: a disk to store data; a transmitting and receiving unit to exchange information with a recovery apparatus over a network; an authentication processor to, when receiving a first authentication key from the recovery apparatus, perform an authentication process based on the first authentication key and a second authentication key; and a writing controller to write an image file to the disk upon the authentication performed by the authentication processor and issue a completion message to the recovery apparatus on completion of the writing.

10 Claims, 7 Drawing Sheets

| AUTHENTICATION KEY ACQUIRING BUTTON | |
|---|---|
| NETWORK ADDRESS | xxx.xxx.xxx.xxx |
| ACCESS ACCOUNT | User0001 |
| ONE-TIME PASSWORD | ******** |

| TIME | MESSAGE |
|---|---|
| XX:XX | A request for the recovery authentication key was transmitted to the recovery authorization server. |
| XX:XX | The authentication was successful in the recovery authorization server, and the recovery authentication key was received. Please connect this terminal to the recovery target server over a network. Please activate the recovery target server using a recovery CD and enter a state of waiting for recovery authentication. |

| RECOVERY START BUTTON | |
|---|---|
| TIME | MESSAGE |
| XX:XX | A request for recovery authentication was transmitted to the recovery target server. |
| XX:XX | The authentication was successful in the recovery target server, and the recovery started. |
| XX:XX | Decoding of a recovery disk image started. |
| XX:XX | The decoding of the recovery disk image was completed. |
| XX:XX | Writing of the recovery disk image in the disk started. |
| XX:XX | The writing of the recovery disk image in the disk was completed. |
| XX:XX | A consistency check started. |
| XX:XX | The consistency check was completed. The recovery disk image was confirmed to have been normally written. |
| XX:XX | A recovery completion message was received. The recovery authentication key is to be deleted. |
| XX:XX | The recovery authentication key was deleted. The recovery operation was completed. |

INFORMATION PROCESSING APPARATUS, RECOVERY APPARATUS, AND DISK RECOVERY METHOD

CROSS-REFERENCE TO RELATED APPLICATION(S)

This application is based upon and claims the benefit of priority of the prior Japanese Patent Application No. 2011-58294, filed on Mar. 16, 2011, the entire contents of which are incorporated herein by reference.

FIELD

The embodiment discussed herein is related to an information processing apparatus.

BACKGROUND

For example, if a storage included in an information processing apparatus, such as a hard disk, is in failure, an image file is developed in a new hard disk, which replaces the faulty hard disk, using a recovery disk. Examples of the recovery disk may include a potable medium, such as an optical disk. When a display device or an input device is coupled to an information processing apparatus, a data recovery operation may be easily or safely carried out. When a display device or an input device is not coupled to an information processing apparatus, whether a recovery disk inserted into the information processing apparatus is suited for the information processing apparatus may not be recognized through the display device. An improper image file may be written to the hard disk.

Related art is disclosed in Japanese Laid-open Patent Publication No. 2002-222106.

SUMMARY

According to one aspect of the embodiments, an information processing apparatus includes: a disk to store data; a transmitting and receiving unit to exchange information with a recovery apparatus over a network; an authentication processor to, when receiving a first authentication key from the recovery apparatus, perform an authentication process based on the first authentication key and a second authentication key; and a writing controller to write an image file to the disk upon the authentication performed by the authentication processor and issue a completion message to the recovery apparatus on completion of the writing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an exemplary displayed screen;
FIG. 7 illustrates an exemplary displayed screen.

DESCRIPTION OF EMBODIMENT

A hard disk of an information processing apparatus may be remotely recovered via a network. For example, on a client side in a client-server system, a client environment may be recovered after a hard disk is replaced. The client transmits a serial number of a new hard disk to the server. The server compares the acquired serial number with the stored serial number of the old hard disk before the replacement and determines whether or not the replacement of the hard disk of the client has been performed. When the hard disk is replaced, the server transfers a selected backup content to the client. The client activates the new hard disk and recovers the client environment.

The same backup content, for example, image file may be written many times and an illegal copy may be made based on the client, for example, the judgment of the administrator of the information processing apparatus.

Figure 1:
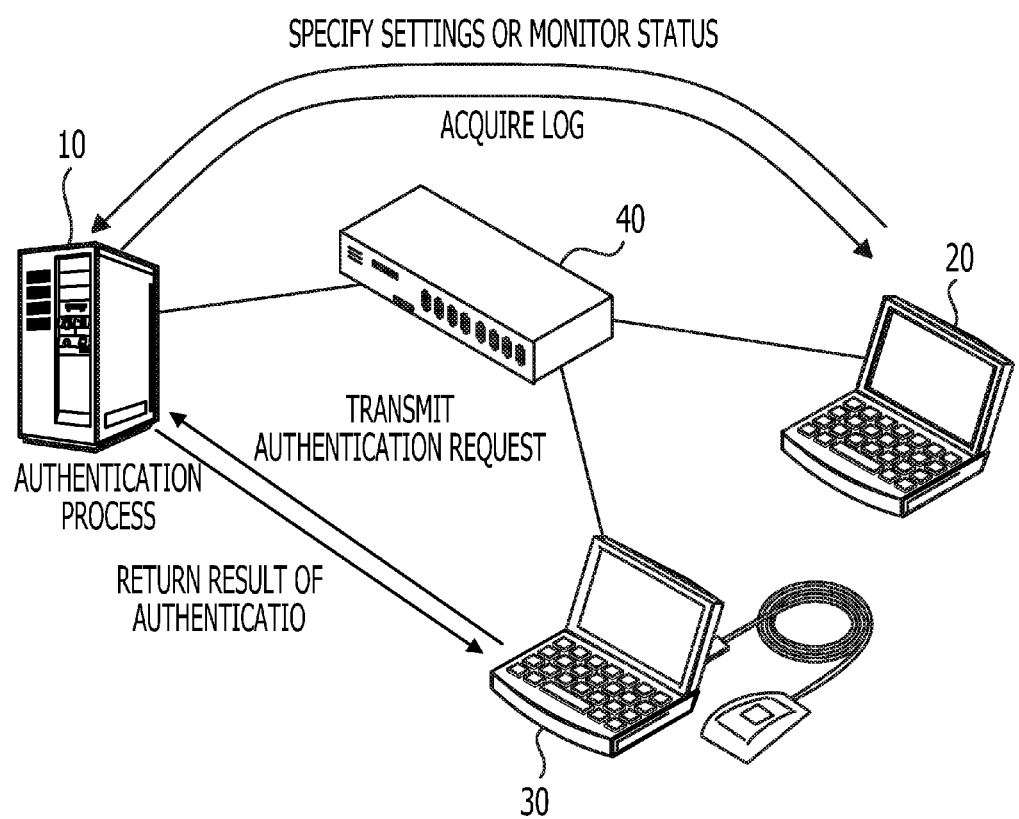
FIG. 1 illustrates an exemplary system.

FIG. 1 illustrates an exemplary system. The system illustrated in FIG. 1 includes an appliance server 10, a control apparatus 20, an authentication client 30, and a network repeater 40. The appliance server 10 on a network performs a process for a specific application. Examples of the appliance server 10 may include a web server, a cache server, an electronic mail server, a firewall server, and a load balancer. The control apparatus 20 may communicate with the appliance server 10 through the network repeater 40. The administrator or other persons of the appliance server 10 may access the appliance server 10 using the control apparatus 20 over the network, specify environment settings of the appliance server 10 or monitor the status of the appliance server 10, and acquire a log from the appliance server 10.

The authentication client 30 may remotely recover data of the hard disk of the appliance server 10. The appliance server 10 may be an example of an information processing apparatus. The authentication client 30 may be an example of a recovery apparatus. The appliance server 10 to which a display device or an input device is not coupled may be used for use which needs a reliability an a network. For example, when a faulty hard disk drive (HDD) in the appliance server 10 is replaced with a new one, the authentication client 30 may remotely and safely recover data over a network (hereinafter may be referred to as "disk recovery" as appropriate).

Figure 2:
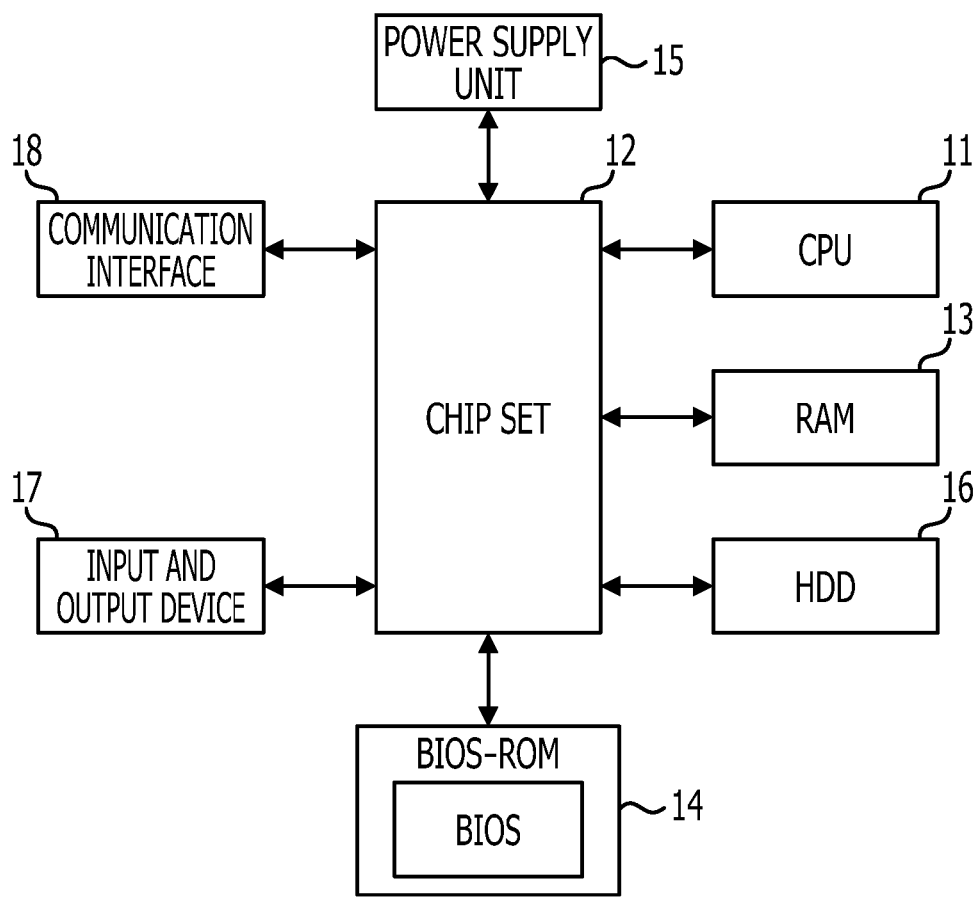
FIG. 2 illustrates an exemplary appliance server.

FIG. 2 illustrates an exemplary appliance server. The appliance server may be the appliance server 10 illustrated in FIG. 1. The appliance server 10 includes a central processing unit (CPU) 11, a chip set 12, a random-access memory (RAM) 13, a BIOS read-only memory (BIOS-ROM) 14, a power supply unit 15, an HDD 16, an input and output device 17, and a communication interface 18. The chip set 12 is coupled to units of the appliance server 10 via a data bus and a control bus. The HDD 16 may be an example of a disk. The CPU 11 may include an authentication processor and a writing controller. The communication interface 18 may include a transmitting and receiving unit.

The CPU 11 may execute various programs corresponding to an application of the appliance server 10. In disk recovery, the CPU 11 reads a program or a file from a recovery disk set in an optical disk drive included in the input and output device 17 and executes the program or performs data process A volatile memory, for example, the RAM 13 may be the main memory of the CPU 11. The RAM 13 temporarily stores the program executable by the CPU 11 and data to which the CPU 11 refers. An image file in the recovery disk is developed in the RAM 13 in disk recovery process. The chip set 12 includes a control circuit for interface between the CPU 11 and other units and a register for controlling each unit. The chip set 12 may correspond to a general purpose interface (GPI), for example. The BIOS-ROM 14 stores a basic input/output system (BIOS). The BIOS may be a basic input and output system (program) for a basic input and output process with hardware. The power supply unit 15 supplies a power to each unit of the appliance server 10. The power supply unit 15 may restrict supplying power in accordance with the status of the appliance server 10, for example, a sleep mode. The HDD 16 (hereinafter may be referred to as "hard disk") may be a nonvolatile storage and may store an operating system (OS) and a program executable on the OS, for example.

Figure 3:
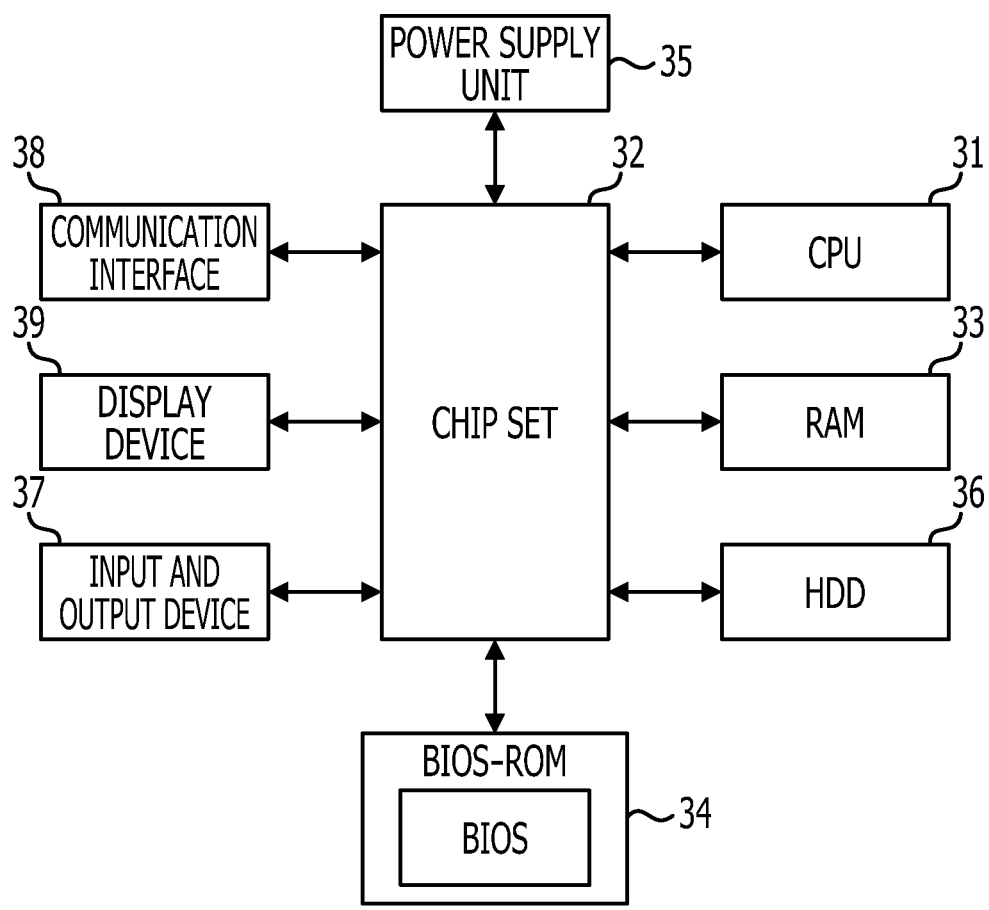
FIG. 3 illustrates an exemplary authentication client.

FIG. 3 illustrates an exemplary authentication client. The authentication client 30 illustrated in FIG. 3 may be the authentication client 30 illustrated in FIG. 1. The authentication client 30 includes a CPU 31, a chip set 32, a RAM 33, a BIOS-ROM 34, a power supply unit 35, an HDD 36, an input and output device 37, a communication interface 38, and a display device 39. The chip set 32 is coupled to each unit in the authentication client 30 via a data bus and a control bus. For example, the authentication client 30 may be a general-purpose personal computer. The CPU 31 may include an authentication key acquiring unit and an authentication processor. The communication interface 38 may include a transmitting and receiving unit.

The CPU 31 prepares for data recovery of the appliance server 10 and executes an authentication program for the disk recovery. The CPU 31 may acquire a recovery authentication key through the communication interface 38 to execute the authentication program and perform disk recovery of the appliance server 10. The CPU 31 may run a Web browser for interpreting hypertext markup language (HTML) data transmitted from a Web server and displaying it on the display device 39 to receive a Web service of the seller of a recovery license, for example. The RAM 33 may be the main memory of the CPU 31. The RAM 31 may temporarily store a program executable by the CPU 31 and data to which the CPU 31 refers. The chip set 32 includes a control circuit for interface between the CPU 31 and other units and a register for controlling each unit. The chip set 32 may correspond to a GPI, for example. The BIOS-ROM 34 stores a basic input/output system (BIOS). The BIOS may be a basic input and output system (program) for a basic input and output process with hardware. The power supply unit 35 supplies a power to each unit of the authentication client 30. The power supply unit 35 may restrict supplying power in accordance with the status of the authentication client 30, for example, a sleep mode. The HDD 36 may be a nonvolatile storage and may store an OS and a program executable on the OS, for example.

The communication interface 38 may include an interface circuit for communicating with the appliance server 10 and a recovery authorization server over the Internet or a local area network (LAN). A communication protocol between the communication interface 38 and each server may be any protocol. The display device 39 may include a liquid crystal display (LCD) monitor including thin-film transistors arranged in a matrix of pixels and a driving circuit for driving the thin-film transistors, for example, and display image data supplied from the CPU 31 on the monitor.

Figure 4A:
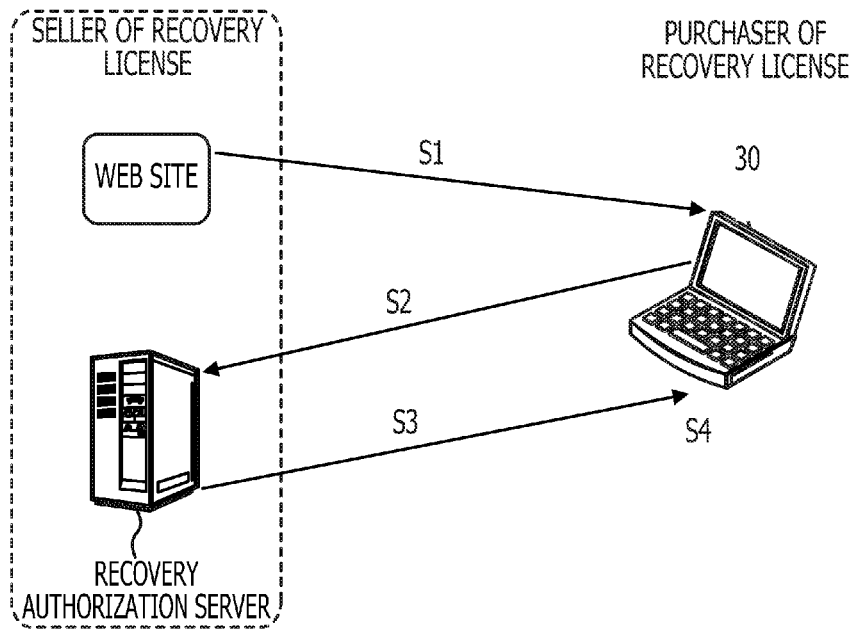
FIGS. 4A and 4B illustrate an exemplary preparation of a recovery environment.
Figure 4B:
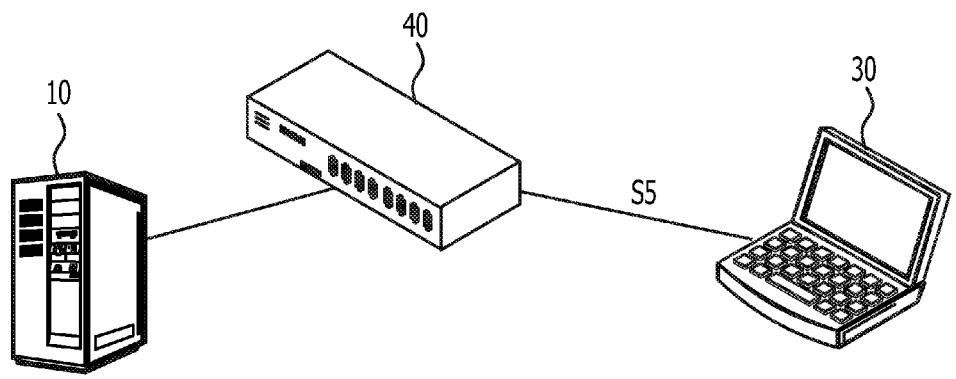

The authentication client 30 prepares for a recovery environment. In the preparation of the recovery environment, the authentication client 30 may previously acquire a recovery authentication key for data recovery of the hard disk of the appliance server 10. The recovery authentication key may include a first authentication key, for example. FIGS. 4A and 4B illustrate an exemplary preparation of a recovery environment. In FIG. 4A, the authentication client 30 may acquire the recovery authentication key from an external seller of a recovery license, for example, may purchase the recovery license. The recovery authentication key may be key information unique to the appliance server 10 whose disk is to be recovered. Using the recovery authentication key may reduce the use of the authentication client 30 in an apparatus other than the appliance server 10 whose disk is to be recovered. The unique key information may be generated based on hardware information unique to the appliance server 10 whose disk is to be recovered. The recovery authorization server illustrated in FIG. 4A may be an example of a key supply apparatus.

In FIG. 4A, in an operation S1, the administrator who operates the authentication client 30, for example, a purchaser of a recovery license accesses a web site run by the seller of the recovery license and purchases recovery license information through a certain procedure. The authentication client 30 acquires the recovery license information. The recovery license information may include the network address, access account, and one-time password of a recovery authorization server run by the seller of the recovery license. In an operation S2, the authentication client 30 makes a authentication request to the recovery authorization server based on information included in the recovery license information. The recovery authorization server performs authentication by checking the access account and one-time password transmitted from the authentication client 30 against the information retained in the recovery authorization server. When the authentication is successful, the recovery authorization server transmits a message of notification of the successful authentication and a recovery authentication key to the authentication client 30 in an operation S3.

In an operation S4, the authentication client 30 sets the acquired recovery authentication key in the authentication program. When the operation S4 is completed, for example, in an operation S5 illustrated in FIG. 4B, the authentication client 30 is coupled to the network through the network repeater 40 and the environment for disk recovery of the appliance server 10 is set.

FIG. 5 illustrates an exemplary displayed screen 500. In FIG. 5, the operations S2 and S3 may be displayed by the display device 39 of the authentication client 30. The CPU 31 may temporarily store logs of communication with the recovery authorization server, and the logs may be sequentially displayed by the display device 39. The administrator of the authentication client 30 may view the progress of the authentication procedure.

A disk recovery is made between the appliance server 10 and the authentication client 30, and a recovery disk is used in the appliance server 10. Examples of the recovery disk may include a compact disk (CD), a digital versatile disk (DVD), and other medium, and the recovery disk may be a storage medium readable by an optical disk drive on the appliance server 10. The recovery disk may include a program and a file described below.

A boot program may activate a boot loader and a kernel, install various drivers and libraries, set an interface of a network, or mount an optical disk drive.

An authentication program may process an authentication request from the authentication client 30 and start disk recovery. The authentication program may return an authentication result that indicates success or failure of starting or termination of the disk recovery to the authentication client 30 and may also return a code in the case of a failure. An image decoding program may develop an encoded compressed image file in a memory, for example, the RAM 13. An image developing program develops the compressed image file developed in the memory, for example, the RAM 13 in the hard disk of the appliance server 10. An image consistency check file may include a checksum value, for example. An image consistency check program checks whether the image file has been normally developed in the hard disk by the appliance server 10. A termination program transmits a recovery completion message to the authentication program, terminates the authentication program, and shuts down the appliance server 10. The image file may be an image file in which a disk image file is compressed by a certain scheme, such as lzop or gzip, and encoded by common key cryptography, such as triple data encryption standard (3DES) or advanced encryption standard (AES).

Figure 6:
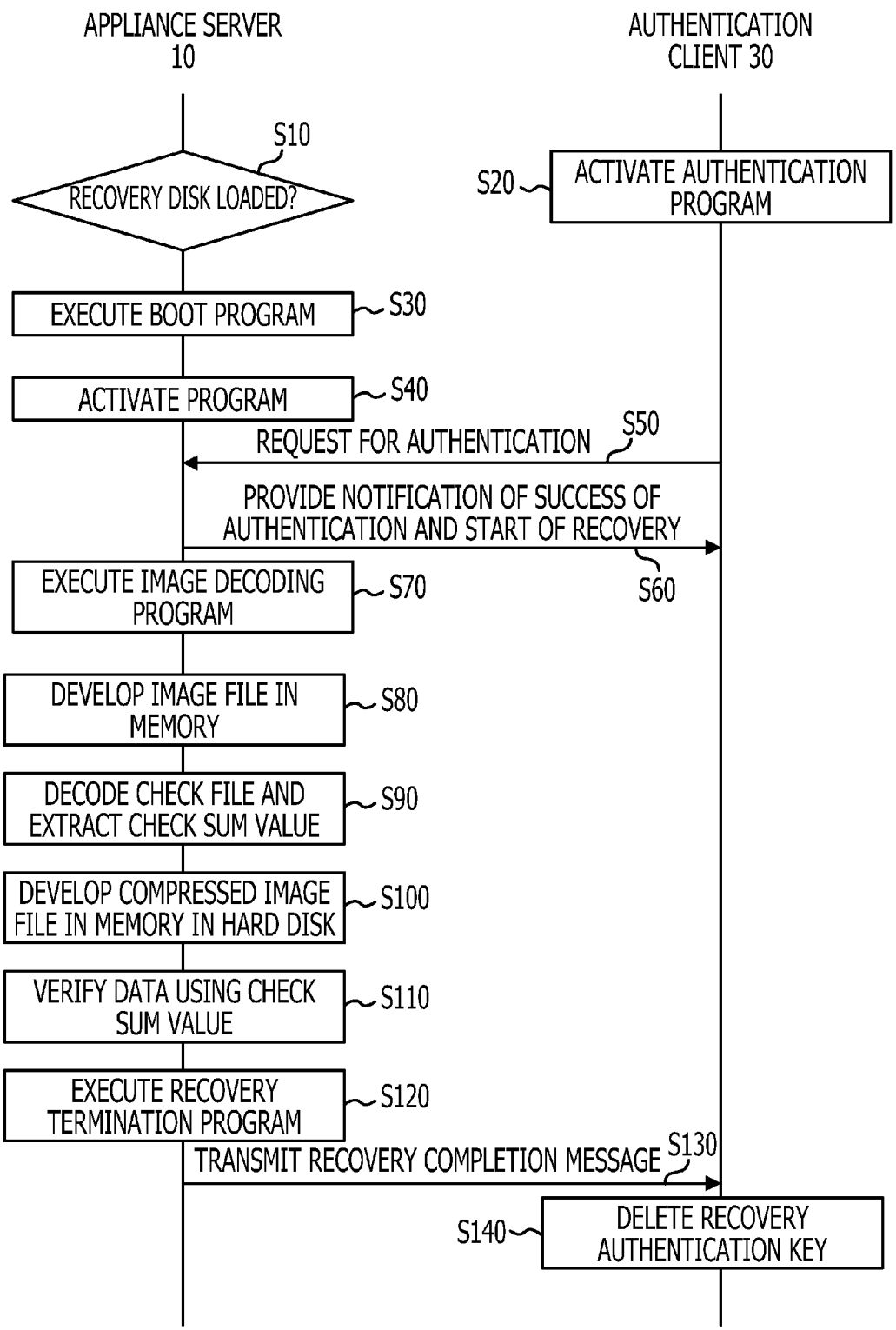
FIG. 6 illustrates an exemplary disk recovery process.

FIG. 6 illustrates an exemplary disk recovery process. The process illustrated in FIG. 6 may be performed by the appliance server 10 illustrated in FIG. 1. In FIG. 6, the process may be performed between the appliance server 10 and the authentication client 30. The process performed by the authentication client 30 may correspond to execution of the authentication program by the CPU 31 of the authentication client 30.

In an operation S10, a recovery disk is inserted into the appliance server 10, and disk recovery of the appliance server 10 starts. As illustrated in an operation S20, the authentication program may be activated in the authentication client 30. When the recovery disk is inserted, the CPU 11 of the appliance server 10 reads the boot program included in the recovery disk and executes it in an operation S30. When the boot program is executed, the CPU 11 may perform a process described below.

The CPU 11 may activate a boot loader and a kernel, install various drivers or libraries, set an interface of a network, or mount an optical disk drive. The CPU 11 acquires information unique to the hardware of the appliance server 10, such as vender information, BIOS version number, CPU type, memory capacity, disk size, or other information and determines whether the appliance server 10 is a target for the recovery. The boot program includes information unique to the hardware, and the CPU 11 compares data on the boot program with data read from the appliance server 10. The CPU 11 writes a determination result code based on a result of the comparison to a determination result file. The CPU 11 determines whether an external interface, such as the universal serial bus (USB), is disabled. For example, the CPU 11 determines whether an external interface is set to be disabled on the BIOS. The CPU 11 writes a determination result code based on a result of the determination to the determination result file. The CPU 11 checks, based on a master boot recode of the hard disk, whether the disk recovery has been performed. The CPU 11 writes a determination result code based on a result of the check to the determination result file. The CPU 11 activates the network interface and acquires the network address using the dynamic host configuration protocol (DHCP) client function. If the network address is not acquired using the DHCP client function, the CPU 11 may acquire a fixed network address stored in the recovery disk.

In an operation S40, the CPU 11 of the appliance server 10 reads a program for use in disk recovery, for example, an authentication program, image decoding program, image developing program, image consistency check program, or termination program from the recovery disk, loads it to the RAM 13, and activates the loaded program. The CPU 11 may be in a state of waiting for authentication, for example, a state of waiting for an authentication request from the authentication client 30. The state of waiting for authentication may be visually or aurally presented to a surrounding person, for example, an operator of the disk recovery or an administrator of a server or the like by light emission using a light emitting device (LED) or generation of a beep. In an operation S50, the authentication client 30 makes an authentication request to the appliance server 10 together with the execution of the authentication program. The authentication client 30 may make the authentication request such that the authentication request includes a recovery authentication key acquired in advance from the recovery authorization server.

The CPU 11 generates an authentication key based on information unique to the hardware of appliance server 10. The generated authentication key may be an example of a second authentication key. The recovery authentication key in the authentication request received from the authentication client 30 may be generated based on information unique to the hardware using a procedure substantially the same as or similar to a procedure of generating the authentication key by the CPU 11, for example, a key generating procedure that includes an operational expression that is used when generating a key based on information unique to the hardware. The recovery authentication key received by the CPU 11 and the authentication key generated by the CPU 11 may be substantially the same. An authentication process may be performed based on match or no-match. The CPU 11 writes a code based on a result of the authentication to the determination result file. The CPU 11 checks the determination result file having the written information. If a result of the check corresponding to an error, for example, code is written, the determination result file is transmitted to the authentication client 30 and the disk recovery process stops. The code corresponding to the error may include any one of E1 to E3 described below.

For E1, the authentication key may not be matched. Because the authentication key, which is based on the information unique to the hardware, is not matched, the appliance server 10 may not be a proper target of recovery. For E2, an external interface, such as the USB, may be in an enabled state. In this case, the disk recovery may not be made from security concerns. For E3, the recovery authentication key received from the authentication client 30 may not be proper data.

When the authentication is successful, in operation S60, the CPU 11 of the appliance server 10 notifies the authentication client 30 of the success of the authentication and start of recovery. The CPU 31 of the authentication client 30 checks the determination result code received from the appliance server 10. When the disk recovery is made, the disk recovery may be displayed by the display device 39 and the administrator may be inquired about continuation of the disk recovery. When the administrator continues the process, the authentication client 30 may request the appliance server 10 to continue the disk recovery. When receiving the request of the continuation of the process, the appliance server 10 may resume an interrupted disk recovery process.

In an operation S70, the CPU 11 of the appliance server 10 may execute the image decoding program.

In an operation S80, the CPU 11 develops the encoded image file in the recovery disk in the RAM 13 and decodes the encoded image file. A decoding key may be a hash value calculated based on information unique to the hardware of the appliance server 10 or a retained authentication key calculated based on the information unique to the hardware of the appliance server 10. The authentication key may be substantially the same as the recovery authentication key. The image file may be encoded by common key cryptography, such as 3DES or AES. The image file in the recovery disk may be decoded by the appliance server to be recovered and may not be decoded by another apparatus. In an operation S90, the CPU 11 decodes the encoded image consistency check file in the recovery disk using the decoding key and extracts the check sum value of the image file from the image consistency check file.

In an operation S100, the CPU 11 of the appliance server 10 develops, for example, expands the compressed image file existing in the RAM 13 (memory) in the hard disk using the image developing program. In an operation S110, the CPU 11 executes the image consistency check program and checks whether the image file has been normally developed in the hard disk. For example, the calculated check sum value of the hard disk and the check sum value in the image consistency check file acquired in the operation S90 are compared. For example, in the data verification process indicated in an operation S110, falsification of the image file or normality of the operation of development in the hard disk may be checked.

In an operation S120, the CPU 11 of the appliance server 10 executes the termination program. When it is determined based on a result of the data verification process that the data on the hard disk presents no problem, in operation S130, the appliance server 10 transmits a recovery completion message based on the execution of the termination program to the authentication client 30, and the appliance server 10 is shut down. When the authentication client 30 receives the recovery completion message, in an operation S140, the CPU 31 deletes the recovery authentication key. The deletion of the recovery authentication key reduces multiple disk recovery operations by the administrator of the authentication client 30 and the illegal copies.

FIG. 7 illustrates an exemplary displayed screen 700. In FIG. 7, the operations illustrated in FIG. 6 may be displayed by the display device 39 of the authentication client 30. The CPU 31 may temporarily store logs of communication with the appliance server 10, and the logs may be sequentially displayed by the display device 39. The administrator of the authentication client 30 may view the progress of the authentication procedure.

The authentication client 30 acquires a recovery authentication key from the recovery authorization server of the seller of a recovery license over a network. When receiving an authentication request based on the recovery authentication key from the authentication client 30, the appliance server 10 compares an authentication key retained in or generated by the appliance server 10 with the recovery authentication key. When the authentication keys match with each other, the image file is written to the disk in the appliance server 10. When receiving a completion message indicating that the writing has been normally completed, the authentication client 30 deletes the recovery authentication key. Each of the recovery authentication key and the authentication key retained in or generated by the appliance server 10 may be an authentication key based on information unique to the hardware. The authentication based on the authentication key may reduce the occurrence of incorrect writing of the image file in another server that is not a recovery target. Because the recovery authentication key acquired by the appliance server 10 is deleted at the completion of the disk recovery process, the use of the recovery authentication key in another server and the occurrence of illegal copies are reduced. The disk recovery of the appliance server 10 may be remotely performed in a safe manner.

In response to the authentication request from the authentication client 30, the image file is written to the hard disk of the appliance server 10, and a completion message indicating the completion of the writing is provided to the authentication client 30. When a display device or an input device is not coupled to the appliance server 10, the execution of the writing may be recognized remotely.

The image file stored in the recovery disk may be encoded using a cryptographic key generated based on information unique to the hardware of the appliance server 10, and the image file may be decoded using a decoding key of a common key system when the image file is developed in the memory. If the information unique to the hardware is invalid, the image file is not developed in the memory, whereby the safety may be improved.

For example, in the system illustrated in FIG. 1, the authentication client 30 makes disk recovery of the appliance server 10. Alternatively, the control apparatus 20 controlling the appliance server 10 may make disk recovery of the appliance server 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a disk to store data;
a memory to store an image file;
a transmitting and receiving unit to receive a first authentication key from the recovery apparatus via a network;
an authentication processor to, when receiving the first authentication key from a recovery apparatus via the network, perform an authentication process based on the first authentication key and a second authentication key; and
a writing controller to write the image file to the disk upon the authentication performed by the authentication processor and issue a completion message from the transmitting and receiving unit to the recovery apparatus via the network upon completion of the writing,
wherein, when an external interface of the information processing apparatus is set to be enabled, the writing controller issues a code indicating the enabling of the external interface to the recovery apparatus via the network and stops a write operation of the image file, and
wherein the writing controller verifies data written to the disk based on a check sum value included in the image file and a check sum value calculated in the writing of the image file to the disk.

2. The information processing apparatus according to claim 1, wherein the writing controller generates a decoding key based on information unique to hardware, decode the image file using the decoding key, and write the decoded image file to the disk.

3. The information processing apparatus according to claim 1, wherein the second authentication key is based on information on the hardware of the information processing apparatus.

4. A recovery apparatus for remotely recovering a disk of an information processing apparatus, the recovery apparatus comprising:
a transmitting and receiving unit to exchange information with the information processing apparatus and a key supply apparatus via a network;

an authentication key acquiring unit to acquire a first authentication key from the key supply apparatus; and an authentication processor to make a request for authentication to the information processing apparatus via the network based on the first authentication key, and delete the first authentication key upon a completion message indicating completion of writing an image file stored in the information processing apparatus to the disk of the information processing apparatus from the information processing apparatus, wherein, when an external interface of the information processing apparatus is set to be enabled, the writing controller issues a code indicating the enabling of the external interface to the recovery apparatus via the network and stops a write operation of the image file, and wherein the information processing apparatus verifies data written to the disk based on a check sum value included in the image file and a check sum value calculated in the writing of the image file to the disk.

5. The recovery apparatus according to claim 4, further comprising:

a controller to determine whether the disk is to be recovered or not based on a code notified by the information processing apparatus.

6. A disk recovery method of recovering a disk of an information processing apparatus using a recovery apparatus, the disk recovery method comprising:

receiving a request for authentication from the recovery apparatus via a network;

performing an authentication process, based on a first authentication key and a second authentication key, by the information processing apparatus upon receiving the request for authentication from the recovery apparatus over the network;

writing an image file stored in a memory of the information processing apparatus to the disk by the information processing apparatus upon the authentication;

verifying that the image file is written to the disk based on a check sum value included in the image file and a check sum value calculated in the writing of the image file to the disk; and providing a completion message to the recovery apparatus by the information processing apparatus via the network upon a normal completion of the writing, issuing, when an external interface of the information processing apparatus is set to be enabled, a code indicating the enabling of the external interface to the recovery apparatus via the network and stopping a write operation of the image file.

7. The disk recovery method according to claim 6, further comprising:

generating a decoding key based on information unique to hardware;

decoding the image file using the decoding key; and writing the decoded image file to the disk.

8. The disk recovery method according to claim 6, further comprising, generating the second authentication key based on information on the hardware of the information processing apparatus.

9. The disk recovery method according to claim 6, further comprising, acquiring the first authentication key by the recovery apparatus from a key supply apparatus over a network.

10. The disk recovery method according to claim 6, further comprising, deleting the first authentication key by the recovery apparatus when receiving the completion message.

* * * * *